US007808378B2

(12) United States Patent
Hayden

(10) Patent No.: US 7,808,378 B2
(45) Date of Patent: Oct. 5, 2010

(54) ALERT NOTIFICATION SYSTEM AND METHOD FOR NEIGHBORHOOD AND LIKE GROUPS

(76) Inventor: Robert L. Hayden, 1630 E. Shaw Ave., Suite 163, Fresno, CA (US) 93710

( * ) Notice: Subject to any disclaimer, the term of this patent is extended or adjusted under 35 U.S.C. 154(b) by 369 days.

(21) Appl. No.: 11/975,044

(22) Filed: Oct. 17, 2007

(65) Prior Publication Data

US 2009/0102644 A1 Apr. 23, 2009

(51) Int. Cl.
*G08B 29/00* (2006.01)
*G05B 23/02* (2006.01)

(52) U.S. Cl. .................. 340/506; 340/3.52; 379/88.23; 379/106.11

(58) Field of Classification Search ................. 340/506, 340/539.11, 539.14, 539.16, 539.17, 539.26, 340/539.28, 10.32, 825.36, 825.49, 3.5, 3.52, 340/286.02, 3.54, 3.6–3.63; 379/265.03, 379/88.21, 88.23–88.26, 106.11, 100.06, 379/106.01, 142.1, 185, 1.02, 9, 9.04, 207.12, 379/207.13, 37–52
See application file for complete search history.

(56) References Cited

U.S. PATENT DOCUMENTS

| | | | | |
|---|---|---|---|---|
| 4,011,409 | A | 3/1977 | Conrad | |
| 6,462,665 | B1 | 10/2002 | Tarlton et al. | |
| 6,509,833 | B2 | 1/2003 | Tate | |
| 6,745,021 | B1 | 6/2004 | Stevens | |
| 6,816,878 | B1 | 11/2004 | Zimmers et al. | |
| 7,071,821 | B2 | 7/2006 | Adamczyk et al. | |
| 7,194,249 | B2 | 3/2007 | Phillips et al. | |
| 7,228,121 | B2 | 6/2007 | Kennedy | |
| 7,391,314 | B2 * | 6/2008 | Lemmon | 340/506 |
| 7,418,085 | B2 * | 8/2008 | Rodkey et al. | 379/88.12 |
| 2003/0022684 | A1 | 1/2003 | Seeger | |
| 2005/0181775 | A1 * | 8/2005 | Rideout et al. | 455/414.3 |
| 2006/0133582 | A1 * | 6/2006 | McCulloch | 379/45 |
| 2006/0175396 | A1 * | 8/2006 | Call et al. | 235/380 |
| 2007/0036279 | A1 * | 2/2007 | Tam et al. | 379/45 |

* cited by examiner

*Primary Examiner*—Jennifer Mehmood
(74) *Attorney, Agent, or Firm*—Richard A. Ryan

(57) ABSTRACT

An alert notification system and method for neighborhood, business, work location, community and other groups for broadcasting an alert message from one member of the group to the other members of the group. A member of the group who sees or hears of an alert condition, which may be criminal activity, suspicious character(s), animal running loose, natural or man-made disaster or the like, becomes an alert initiator by calling a centrally based alert processing device that, after verifying the caller is a member of a group, allows the caller to record an audible alert message describing the alert situation. The processing device then broadcasts the alert message to each member of the alert initiator's group or groups so the alert recipients may take appropriate action to protect lives and/or property. The alert processing device stores information regarding the caller and the message for later auditing and retrieval purposes.

19 Claims, 4 Drawing Sheets

ALERT NOTIFICATION SYSTEM AND METHOD FOR NEIGHBORHOOD AND LIKE GROUPS

CROSS-REFERENCE TO RELATED APPLICATIONS

None.

BACKGROUND OF THE INVENTION

A. Field of the Invention

The field of the present invention relates generally to systems and methods of quickly and effectively notifying others of an alert situation, including the presence of suspicious or dangerous activity, need for assistance and other emergency warnings. More particularly, the present invention relates to such systems and methods that are group-based, with such groups being based on a neighborhood, school, community or the like, for providing an alert notification to members of the group. Even more particularly the present invention relates to such systems and methods where a member of the group is able to notify others in his or her group of an alert situation.

B. Background

As populations and concentrations of population have increased, so has the occurrence of emergencies and the like that require notification of the proper authorities and of the citizens so they may effectively respond. For instance, virtually every community in the United States has a 911 emergency reporting system that allows members of the community to call a centralized call handling center to request, depending on the type of emergency, police, fire and/or ambulance assistance. These systems are configured to allow anyone, whether a member of the community or not, to be able to report an emergency from any telephone having a phone signal and being capable of dialing 911. When a 911 call is made, the caller explains the emergency to the operator, who then notifies the proper emergency response organization(s) so that they may send the necessary assistance. Most 911 systems have caller identification technology to enable the operator to call the caller if necessary and many 911 systems have the ability to identify the approximate location of a cellular telephone call. Despite the improved caller technology, 911 systems are generally configured to be an emergency call-in system where a citizen or other caller reports an emergency to the emergency operator as opposed to the authorities notifying members of the public of an emergency.

To notify members of the public of an emergency of which they should be aware, most communities rely on public broadcasting across television and radio stations. One example of use of such systems are the weather alerts that are broadcast by the National Weather Service ("NWS") which is intended to notify persons of an approaching or existing severe storm, such as hail and/or tornado conditions. The government also has the ability to interrupt television and radio signals to transmit emergency information via the Emergency Broadcasting Network. While both of these systems are generally useful for notifying persons about an existing or pending emergency situation, they have the limitation that only persons who happen to have their television or radio on at the time of the emergency broadcast will receive the warning. In addition, many such alerts are not sufficiently geographically specific to the location where the listener is located, such that he or she may not know from the broadcast whether the threat is actually imminent or even applicable. For storm or other weather-related emergencies, the problem with having the television or radio on is solved by having emergency-specific radios that turn on when the receive a signal from the NWS. This type of emergency response system requires the purchase of a specific radio and is generally only applicable to weather-related emergencies and, as such, is not that commonly utilized outside of areas that commonly are affected by severe weather.

To compensate for the inability to notify persons of an emergency situation when they do not receive the information via television or radio, most communities either utilize a siren-type system or some form of personal notification. In certain areas of the country where storm-related emergencies are relatively common (i.e., tornado alley), most communities have an audible alarm system that loudly broadcasts a siren to warn persons that a severe storm is approaching and that they should take cover immediately. While this type of system is useful for warning of a single, specific type of emergency, it is generally not suitable for warning of general emergencies. For instance, in areas subject to severe storms or wildfire conditions the proper public response is likely opposite, such as take cover versus flee immediately. As such, siren-based alert systems are generally not suitable for warning a community, or some segment of the community, of a general emergency situation. In order to selectively warn persons of the need to stay inside their house, office, school or other building, such as in the situation of a nearby chemical spill or a criminal or wild animal on the loose, or the need to evacuate the area due to a wildfire, potential dam failure or poisonous chemical spill, communities generally rely on personal notification of persons in the buildings. This is generally achieved by sending a police car or fire truck into the neighborhoods with a loud speaker broadcasting a message telling the public to take the appropriate action or by sending police or fire personnel door-to-door. In addition to not being a very time efficient manner of notifying public of an immediate danger or threat, it also places the emergency personnel in harms way by requiring them to be combing the neighborhoods as a dam is failing, a wildfire is approaching, a deadly chemical cloud is in the area or the like.

Over the years, various systems and methods have been developed to improve the ability of notifying the proper persons of an alert. For instance, U.S. Pat. No. 7,194,249 to Phillips describes a system of providing urgent public information that comprises receiving an alert message from at least one alert source, such as a device or public entity, and then transmitting the alert to at least one subscriber via a communication network. The alert receiver is configured to analyze the alert information to determine whether a particular subscriber should receive the alert. U.S. Pat. No. 6,509,833 to Tate describes a method and system for providing a warning alert to the subscribers of a telecommunication system who reside and/or are located in a certain geographic area. U.S. Publication No. 2003/0022684 to Seeger and U.S. Pat. No. 6,745,021 to Stevens also describe systems and methods of notifying telephone or wireless subscribers of a broadcast alert based on a list of subscribers who are in the relevant geographical area. U.S. Pat. No. 7,071,821 to Adamczyk describes a method and system of notifying persons who are on a subscriber's emergency notification list based on an automated process or those persons who are geographically nearest the subscriber, based on GPS technology, when he or she sends the alert message.

One significant problem with all presently available emergency alert notification systems is that they do not facilitate the localized reporting of an alert and then the rapid distribution of that alert, with details as to the nature of the alert, to the persons most likely to need to know about the alert. As an example, if a person sees a suspicious character in his or her neighborhood who may or may not actually be committing a crime, but is nonetheless acting suspiciously, there is generally not much he or she can do to notify others in the neighborhood of the danger possibly presented by the character. Although the person who sees the character could call 911 and request the police to respond to check out the character, this could be too late to help the next door neighbor who would have otherwise benefitted from a warning and locked their door. Ideally, the person seeing such a character would know the name and telephone number of each of his or her neighbors and could call them to personally warn them of the character so that the neighbors may take whatever action they feel appropriate (i.e., call their children into the house and lock the doors). The reality of modern living is, however, that most people do not even know their neighbors all that well and do not have the telephone number (if even their name) of all of the neighbors who could be affected. In addition, it would generally take too much time to call each neighbor and then explain to them the situation for it to be of any immediate alert benefit. The ability of one neighbor to notify each of his or her neighbors of an alert situation is applicable to a wide variety of emergency type of situations determined by the first neighbor, including criminals, wild animals and the like, as well as to passing on information obtained from a public broadcast on the television or radio, thereby notifying others who may not have theirs on at the time the emergency message is broadcast.

In addition to neighbor on neighbor alert notifications, an emergency alert notification system would also be useful for a wide variety of groups that can benefit from shared information. For instance, persons who all work in the same general building or location and persons who children go to the same school could benefit from shared emergency alert notifications. As an example, if there was an emergency lockdown at a school due to shooting or other event, it would be beneficial to be able to quickly, accurately and efficiently notify the parents so that they can be aware of the situation and, if necessary, make arrangements to come get their child or children. The current process for a parent to find out such information is via the news on a public television or radio broadcast, from a friend or relative who hears about the situation, or from their child or the school after the situation has already been resolved, all of which either rely on some amount of luck or are generally not acceptable.

What is needed, therefore, is a new system and method for an alert notification system that allows one or more members of a group, such as a neighborhood group, to quickly, efficiently and effectively notify other members of the group of an alert situation, such as an emergency or potential emergency. Such a system and method should be suitable for use by a variety of groups, including neighborhood-based groups, school-based groups, business districts, work location or building-based groups and communities. Preferably, such a system and method would be configured as a subscriber system wherein one subscriber initiates the alert message describing the alert situation in sufficient detail to such that other subscribers who receive the alert message will know what the situation is and how best to respond. As a subscriber-based system, the method of using the alert notification system should include one or more steps to verify that the alert initiator is a legitimate member of a subscriber group prior to transmitting the alert message to other members of the initiator's group.

SUMMARY OF THE INVENTION

The alert notification system and method for neighborhoods and like groups of the present invention solves the problems and provides the benefits identified above. That is to say, the present invention discloses a telephone interactive voice response based alert notification system and method that is configured to allow one member of a group, which may be a neighborhood, building, store or like group, alert other members of the group of an alert situation, which may be actual or suspected criminal activity, suspicious behavior, gang activity or the like. In use the alert notification system of the present invention can reduce the occurrence of such alert situations by discouraging the type of behavior that results in an alert situation in the location where the alert notification system is in use. Like the somewhat dated neighborhood watch programs, the alert notification system of the present invention empowers and re-establishes the sense of neighborhood, group and community with regard to the members of the group by allowing them to function as a group, as opposed to standing alone as an individual, in the face of an alert situation. In a preferred embodiment of the present invention, the alert notification system is a subscriber-based system that combines two or more subscribers into neighborhood or other groups based on geographic or other commonality among the members of the group. The interactive voice response component of the present system includes a procedure for verifying that a person who contacts the system administrator, which is typically a computer automated system, claiming to be a group member reporting an alert situation is actually a member of the group so that he or she may quickly forward to other members of the group the information he or she has witnessed or has otherwise been made aware that would be of likely benefit to the other group members.

In one general aspect of the alert notification system of the present invention, the system comprises at least one group having a plurality of group members and an alert processing device in communication with the group members in order to receive and transmit alert messages in response to an alert situation. The group members include at least one alert initiator and one or more alert recipients. The alert processing device has a communication component that is configured to receive a first communication from the alert initiator and transmit a second communication to the each of the alert recipients. The first communication, which is preferably a telephone call, comprises an alert message from the alert initiator that describes the circumstances of the alert situation. The second communication, which is also preferably a telephone call, comprises the alert message and is broadcast to all of the other members, the alert recipients, of the subject group. Preferably, the alert message is an audible recording from the alert initiator that describes the alert situation and provides sufficient detail for the alert recipients to make an informed decision regarding the proper course of action. In one embodiment, the group is a neighborhood group and the group members are neighbors. In another embodiment, the group is a work location group and the group members have employees that work at or near the same location. In yet another embodiment, the group is a business group and the group members are businesses that are at or near the same location. The preferred embodiment of the alert notification system includes a system administrator in communication with the alert processing device to maintain the system.

In one general aspect of the method of utilizing the alert notification system of the present invention, the method is utilized to broadcast an alert message regarding an alert situation from one member, the alert initiator, of a group to each of the other members, the alert recipients, of the group. In one embodiment, the method comprises the steps of the alert initiator perceiving the alert situation, the alert initiator contacting an alert processing device, the alert processing device verifying the authority of the alert initiator to initiate an alert message, the alert initiator leaving a message describing the alert situation, the alert processing device associating the alert initiator with one or more specific groups and the alert processing device broadcasting the alert message to each of the alert recipients of the subject group. In the preferred embodiments, the contacts between the group members, both the alert initiator and the alert recipients, is by telephone communication and the alert message is an audible recording by the alert initiator. Also in the preferred embodiment, various caller and message attributes are saved for later auditing and related purposes. The verifying step includes comparing the alert initiator's caller ID to a database of group member telephone numbers and then comparing a PIN entered by the alert initiator with the database. If no match is found with the caller ID, then the user must enter his or her telephone number that is associated with the database. If the alert initiator is a member of two or more groups, the method also includes the step of requesting the alert initiator to select one or more of the groups for distribution of his or her alert message. Once the group is selected, which is automatic if the alert initiator belongs to only one group, then the recorded alert message is sent to each member of the subject group. In one embodiment of the method, the group comprises a neighborhood group and the alert initiator and the alert recipients are neighbors. In another embodiment of the method, the group comprises a work location group and the alert initiator and the alert recipients have employees that work at or near the same location. In yet another embodiment, the group comprises a business group and the alert initiator and the alert recipients are businesses that are at or near the same location. If desired, the audible alert messages can be saved in an archival system.

Accordingly, the primary objective of the present invention is to provide an alert notification system and method for neighborhoods and like groups that provides the advantages discussed above and overcomes the disadvantages and limitations associated with presently available alert notification systems and methods.

It is also an important object of the present invention to provide an alert notification system that has at least one group comprised of a plurality of members wherein the system is configured to allow a member of the group to quickly, efficiently and effectively contact other members of his or her group to provide information, such as a warning, to them regarding the existence of an alert situation so as to allow the various group members to take appropriate action as may be required under the circumstances.

It is also an important object of the present invention to provide an alert notification system that allows a member of a group of members to contact an alert processing device that receives the member's contact, verifies he or she is a member of a group, identifies the caller's group, records an alert message and transmits the recorded alert message to other members of the caller's group.

It is also an important object of the present invention to provide an alert notification system that comprises an alert processing device that provides an audit trail of received and sent alert messages by recording the attributes of the caller who initiated the alert message, including the name, phone number and entered password, and attributes of the alert message itself, including the time, length and substance of the alert message.

It is also an important object of the present invention to provide an alert notification system that is adaptable for use with groups of various sizes and attributes, including neighborhood groups, school-based groups, business groups, area groups and community groups.

It is also an important object of the present invention to provide a method of utilizing an alert notification system for an alert initiator that generally comprises the steps of receiving information regarding an alert situation, contacting an alert processing device with the alert information, verifying the alert initiator is a member of a group, identifying the member's group, recording an alert message and broadcasting the alert message to other members of the group.

The above and other objectives of the present invention will be explained in greater detail by reference to the attached figures and the description of the preferred embodiment which follows. As set forth herein, the present invention resides in the novel features of form, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
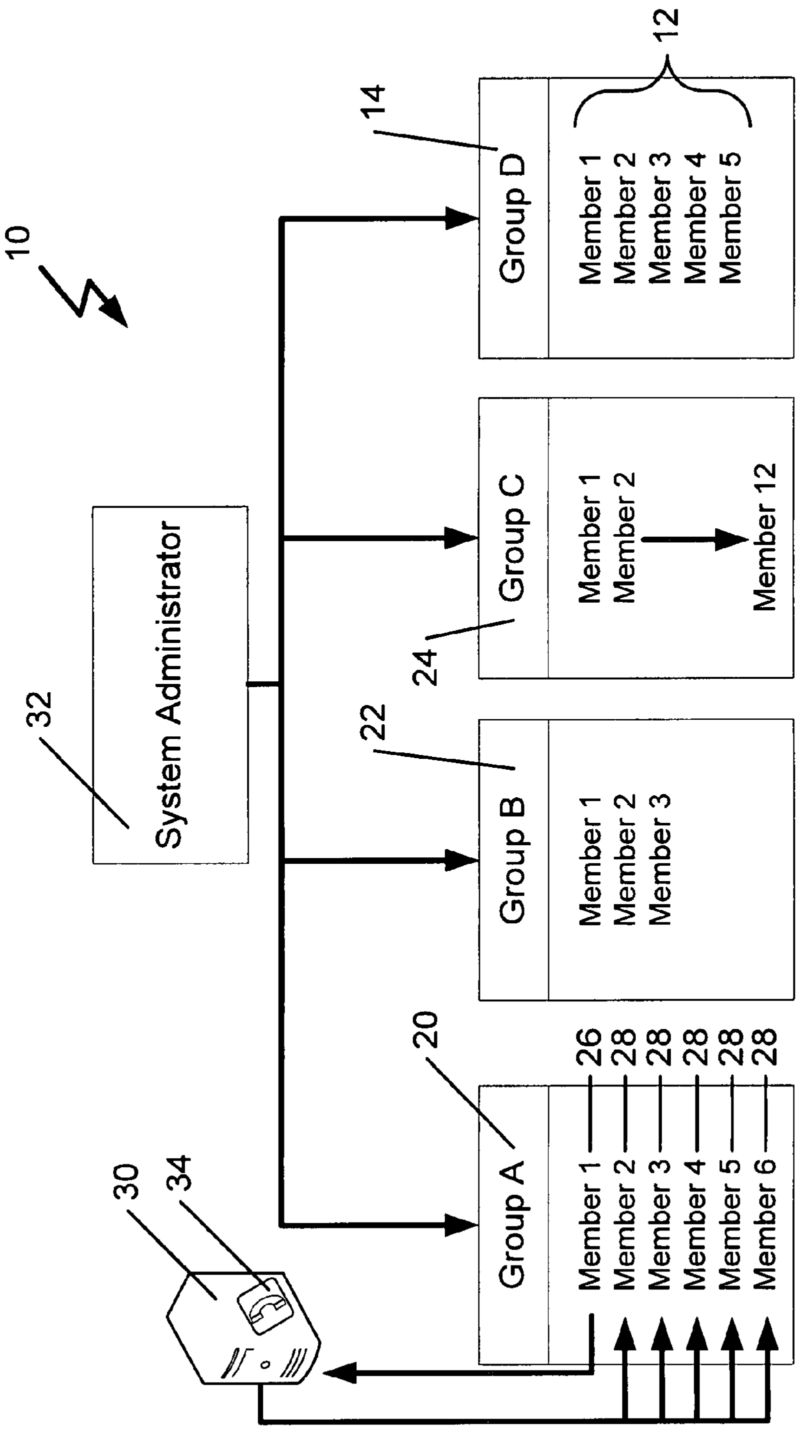
FIG. 1 illustrates an alert notification system configured according to a preferred embodiment of the present invention showing one member of a neighborhood group contacting the alert processing device for transmitting an alert message to the other members of the group.

With reference to the figures where like elements have been given like numerical designations to facilitate the reader's understanding of the present invention, the preferred embodiments of the present invention are set forth below. The enclosed figures and drawings are merely illustrative of various preferred embodiments of the present invention and, as such, represent several different ways of configuring the present invention. Although specific components, configurations and uses are illustrated, it should be understood that a number of variations to the components and to the configuration of those components described herein and in the accompanying figures can be made without changing the scope and function of the invention set forth herein. For instance, although the figures and description provided herein generally refer to neighborhood, office and business groups, those skilled in the art will readily understand that this is merely for purposes of simplifying the present disclosure and that the present invention is not so limited, as the present invention is equally applicable for use with a wide variety of differently configured groups.

An alert notification system that comprises the components and is configured pursuant to a preferred embodiment of the present invention is shown generally as 10 in the figures. As set forth in more detail below and shown in FIGS. 1 through 5, the alert notification system 10 and method of use of the present invention provides the ability for one or more group members or subscribers, identified collectively as 12, of a group 14 to record an alert message 16 that he or she believes is of benefit to the members of group 14 in order to notify all of the other members of group 14 of an alert situation 18 so that they may take appropriate action to protect themselves, their loved ones and/or their property. One of the primary goals of the present invention is to allow those members/subscribers having common interests to band together so as to function as a collective group 14 to better serve their individual interests and provide a sense of empowerment against persons or circumstances that could harm them or damage their property. In so doing, the alert notification system 10 of the present invention reduces the likelihood of such harm or damage and, thereby, improves the lives of those in the group 14. Although the present invention is very useful with regard to natural and man-made disasters or accidents, the present invention is particularly applicable to criminal activities, seeking to reduce the occurrence of crime and improving the likelihood of solving a crime when it does occur.

As used herein the terms "group members" and "subscribers" are used interchangeably to refer to any entity, including individuals, households, businesses or the like, that is capable of receiving an alert message 16 and acting on that message as may be appropriate under the circumstances. In a preferred use of the present invention, group members 12 will subscribe to the alert notification system 10 and pay a monthly or annual fee. The term "group" is used to refer to a grouping of group members or subscribers 12. A group 14 may be a neighborhood comprising a plurality of households, one or more businesses that want to act in concert, a number of members or subscribers 12 that have a common interest, such as a school-based group where the group members 12 are parents of children who attend the school, and/or various combinations of the above that represent a community or the like. Generally, but not specifically required, a group 14 will have one or more attributes in common. For instance, a neighborhood group, such as 20 in FIGS. 1 and 2, will typically comprise a plurality of households that are geographically in the same neighborhood, commonly with one or more of the households being located adjacent to each other (i.e., next door neighbors). A work location based group, such as 22 in FIGS. 1 and 3, may comprise two or more work locations or buildings that are geographically close to each other such that a problem at or near one of the locations or buildings will warrant notification of employees at the other location or building. A business based group, such as 24 in FIGS. 1 and 4, can be a strip mall or an indoor mall type of business where the businesses share common spaces and are in very close proximity to each other. In any of the above groups 14, the group 14 may include any security personnel who are assigned to watch or protect the neighborhood, work area or business location. A group may also be formed by persons, offices and businesses that are located in a certain section or area of a town, city or county or it may comprise an entire community, such as a town, city or county. A group could also be a group of individuals and/or other entities (i.e., companies or the like) that have a common interest but are not geographically related. In general, the make-up of a group 14 is very open and can be left to the collective desires of two or more subscribers 12 who believe that they should band together as a group.

The term "alert situation" is used herein to refer to the happening of an event that one or more group members 12 perceive, directly or indirectly (such as receiving information about) and then believe it would be beneficial for other members of the group 14 to be aware of so that they make take action which may be appropriate under the circumstances. An alert situation 18 may be actual or suspected criminal activity which is taking place, the presence of a person exhibiting suspicious behavior, several known or unknown persons gathered together in an appearance of gang activity, two or more persons who are arguing and who appear to be ready to fight, or a wide variety of other human activities. An alert situation 18 may also be the presence of an animal who is not known, such as a large unrecognized dog, or which is wild, such as a bear, moose or other animal, that roams into a neighborhood. An alert situation 18 may also be information pertaining to an approaching severe storm, a wildfire, potential dam failure, rising flood waters or other natural or man-made disasters. A group member 12 may perceive of an alert situation 18 through his or her own visual perception or by receiving information from a television, radio or police band broadcast or from a trusted source, such as a law enforcement officer, fireman, relative, close friend or the like. The above alert situations are only exemplary of possible circumstances that may qualify as an alert situation 18 for the present invention and are not intended to limit the present invention.

As explained in more detail below, in response to the perception of an alert situation 18 one of the group members 12 will create an alert message 16 for dissemination to other members of group 14. The group member 12 who perceives the alert situation 18 and creates the alert message 16 is identified as the alert initiator 26, as shown in FIGS. 1 through 5. In a preferred embodiment of the alert notification system 10 of the present invention, the first communication comprises an alert message 16, such as an audible recording that is recorded in the alert initiator's own words and voice, after being received via telephone (whether landline or mobile phones), and then transmitted, as the second communication, by telephone to other members in his or her group(s) 14, who are identified as the alert recipients 28. The second communication will comprise the alert message 16 provided by the alert initiator. In an alternative configuration, the alert message 16 can be originally transmitted (first communication) from the alert initiator 26 via a computer, such as an email or a text message, and then converted through appropriate software to an audible message (second communication) for transmission as the alert message 18 or be transmitted directly as an email or text message. In another alternative configuration, alert message 16 can be transmitted by the alert initiator 26 as the first communication via an audible means (i.e., telephone) and then converted by software to an email or text message as the second communication. Various combinations of the above can also be utilized as desired.

In response to receiving the alert message 16 the other group members, or alert recipients 28, will typically take whatever action they deem necessary and/or reasonable. For instance, in the example of a suspicious character or a wild animal roaming around the neighborhood, the alert recipients 28 will typically collect or call in any children playing outside and lock their doors. One or more alert recipients 28 may choose to call the police or animal control for assistance. In the case of an approaching severe storm or tornado, the alert recipients 28 may attempt to protect some of their valuables and seek appropriate cover. When warned of an approaching flood or wildfire, the alert recipients 28 will typically gather what they can and flee. Under certain circumstances, such as a forced evacuation, the alert recipients 28 will take the action that they are directed. The above scenarios are only exemplary of the types of actions that may be taken by an alert recipient 28 in response to an alert message 16, as the possible or likely actions may vary as widely as the attitudes and predispositions of those who are the alert recipients 28.

In its preferred embodiments, the alert notification system 10 of the present invention is an interactive voice response system that comprises an alert processing device 30 which is configured to receive the telephone call from the alert initiator 26 in response to an alert situation 18, process the telephone call and then broadcast the alert message 16 to the alert recipients 28, as shown in FIGS. 1 through 4. In addition to being in communication with the various group members 12 and groups 14, the alert processing device 30 is in communication with the system administrator 32, shown in FIG. 1, the role of which is described in more detail below. As will be appreciated by those skilled in the art, alert processing device 30 will preferably be a computer running a generally available computer operating system software and having a data storage unit, such as an internal or external hard drive, associated therewith for storing the computer operating system, necessary software programs and data associated with the alert notification system 10. Computer hardware and software suitable for accomplishing the various processes of the alert notification system 10 are well known and are either generally commercially available or can be custom written by those skilled in the art. Included with the processes that are run or controlled by alert processing device 30 is the verification of the alert initiator 26 as a group member 12 and the data auditing trail functions described below.

Alert processing device 30 includes a communication component, shown as 34, suitable for connecting alert processing device 30 to a telephone communications network for receiving and transmitting telephone calls over a wired or wireless phone system. In a preferred embodiment, members 12 of group 14 will only be able to access the alert processing device 30 via telephone lines. In alternative embodiments, the alert initiator 26 can also access the relevant data through his or her own computer or other devices. As with the data storage unit, communication component 34 can be integral with or externally connected to alert processing device 30. The alert processing device 30 and its associated communication component 34 must be configured to be able to rapidly receive, process and transmit simultaneous telephone calls in and out of alert processing device 30. The data storage unit must be configured to store and allow rapid retrieval of large amounts of data from the alert processing device 30 in a short amount of time. For instance, it is likely there will be many thousands of groups 14, some of which will have hundreds of members 12. In the situation of an alert message 16 for a large group 14, the alert processing device 30 needs to be capable of receiving incoming telephone calls from multiple alert initiators 26 for the same event and then rapidly transmitting the alert message 16 to each of the alert recipients 28. In one embodiment, the alert processing device 30 is preferably configured so as to be capable of broadcasting 1,000 alert messages per minute or more to the various alert recipients 28.

The system administrator 32 is a person, group of persons or entity, whether public or private, that oversees the operation of the alert notification system 10 and assists in the formation of individual group members 12 into one or more groups 14. In one of the preferred configurations, the group members 12 will subscribe to a service provided and operated by the system administrator 32. The system administrator 32, directly or through the use of one or more contractors, will solicit individuals, businesses or other entities to join with the alert notification system 10 as a subscriber 12 and assist those subscribers with identifying and forming a functioning group 14. The system administrator 32 will also have maximum available privileges with regard to access to alert processing device 30 to maintain and operate the alert notification system 10. In this role, the system administrator 32 will be able to view all contact information for an individual subscriber 12 and add, edit and delete records and, as necessary, groups 14, and send out alert messages 16 to one or more groups 14, as shown in FIG. 1. In the preferred configuration of alert notification system 10, where the group members 12 only have access to the alert processing device 30 through a land or mobile telephone in order to leave an audible alert message 16, the system administrator 32 will have a web access interface to manage subscribers 12 and groups 14.

In contrast to the system administrator 32, standard subscribers 12 will only have the ability to create an alert message 16, initiate a broadcast of their alert message 16 and receive alert messages 16 initiated by other group members 12. In one embodiment, the alert notification system 10 also includes a second category of subscribers 12, restricted subscribers, who are only able to receive alert messages 16 created and broadcast by standard subscribers. The standard subscribers 12 will have information stored in the database controlled by the alert processing device 30 that is sufficient to identify the person claiming to be an alert initiator 26 to ensure that false alert messages 16 are not initiated and broadcast by those with dishonorable motives. Both standard and restricted subscribers 12 will have information, such as one or more telephone contact numbers, stored in the alert processing device 30 that will enable an alert message to reach the subscriber 12 in case of an alert situation. Typically, the subscribers 12 will be able to store their home telephone number (usually a land line) and one or more mobile phone numbers.

Figure 3:
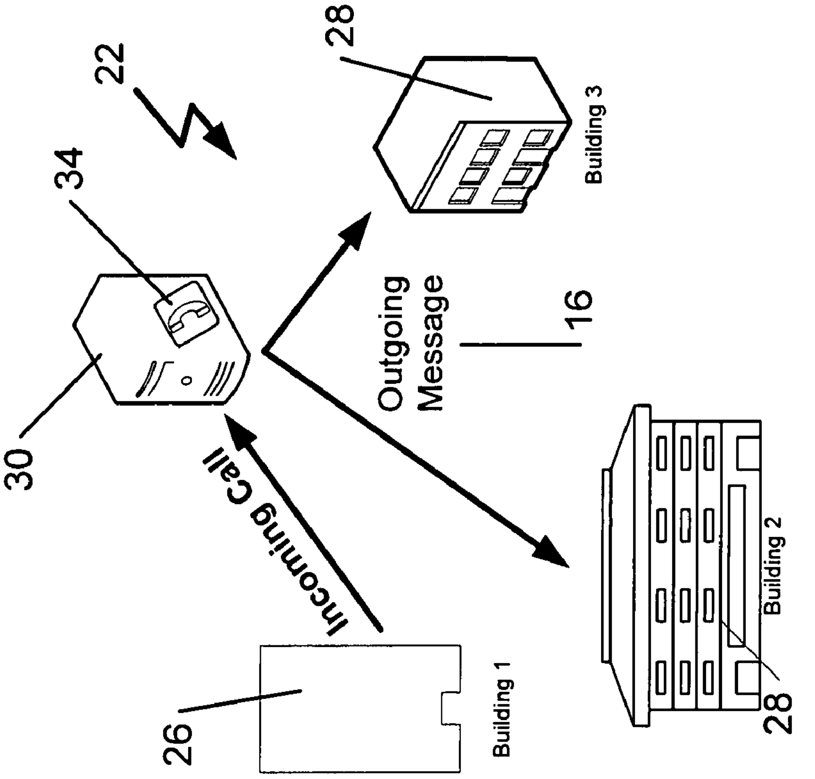
FIG. 3 is a schematic of an office group in accordance with various embodiments of the present invention.
Figure 2:
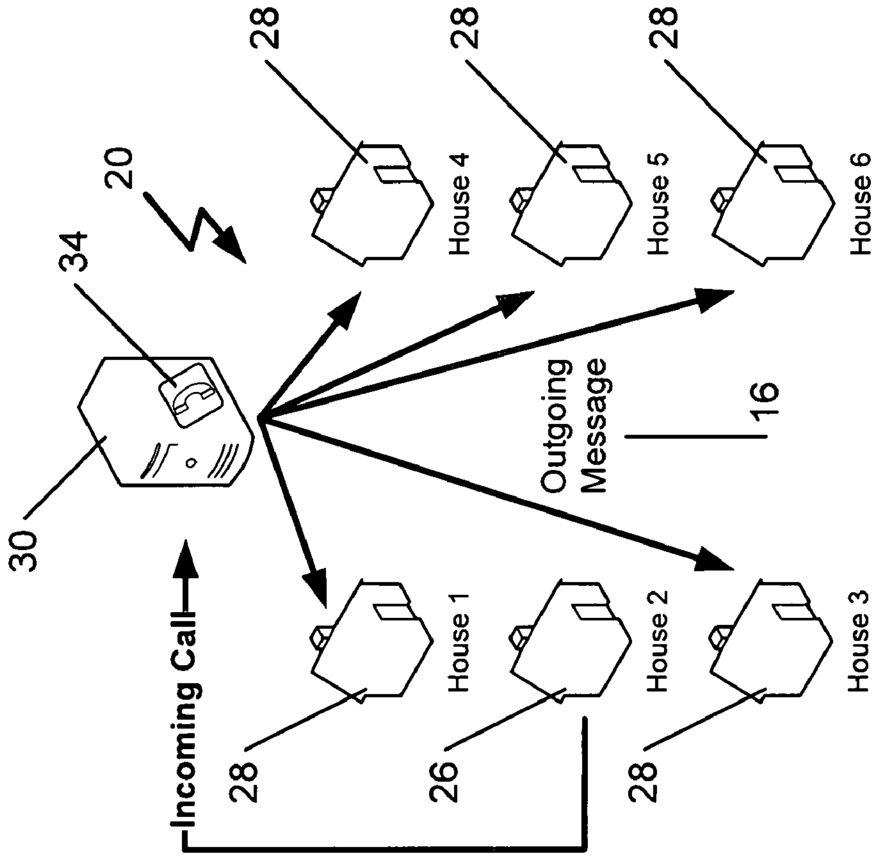
FIG. 2 is a schematic of a neighborhood group in accordance with various embodiments of the present invention.
Figure 4:
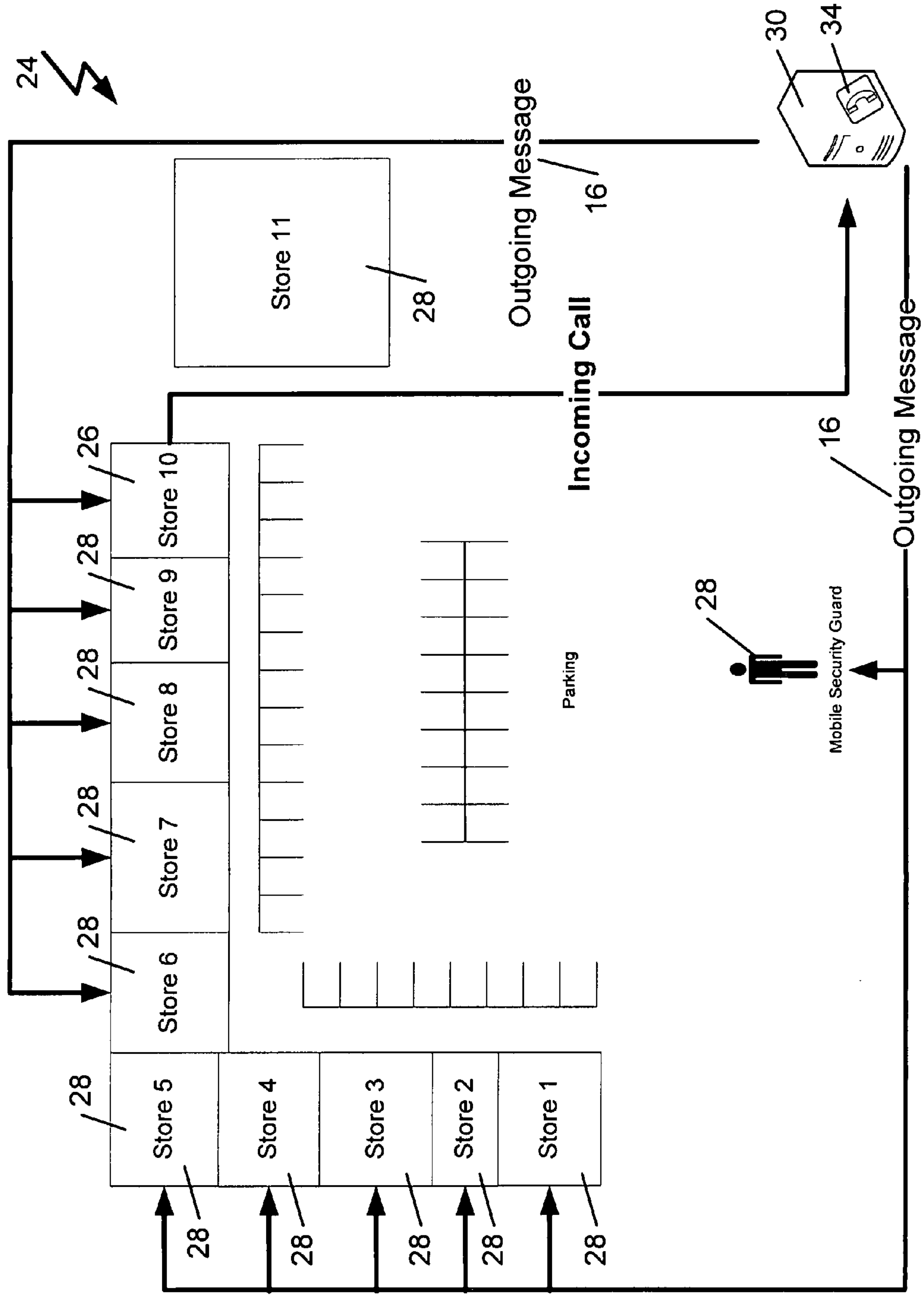
FIG. 4 is a schematic of a business group in accordance with various embodiments of the present invention.

Various group-based scenarios of use of the alert notification system 10 of the present invention are illustrated in FIGS. 2 through 4. FIG. 1 illustrates the use of alert notification system 10 with a neighborhood group 20 comprising a plurality of neighboring households, shown as House 1 through House 6 in the figure. Each of the houses has at least one subscriber 12 to the alert notification system 10 of the present invention. In the scenario shown, the subscriber 12 in House 2 has seen, been informed of or otherwise perceived an alert situation 18 that he or she believes is necessary to warn or inform his or her neighbors about. The subscriber 12 in House 2 calls the alert processing device 30, which will typically be a local or a toll-free telephone call, to leave an alert message 16, thereby becoming an alert initiator 26. After going through the incoming call process, which is set forth in more detail below and in FIG. 5, including the verification procedures, the alert initiator will be prompted to leave a voice message describing the alert. The alert processing device 30 will then transmit or broadcast the alert message 16 to all of the members, such as those persons who reside in House 1 and House 3 through 6 of the alert initiator's group 14. These persons will become the alert recipients 28. Upon receiving the alert message 16, the alert recipients 28 can take the action they deem appropriate to protect themselves, their loved ones and/or their property. FIG. 2 illustrates a work location group 22 comprising three buildings, Building 1 through 3. In the scenario illustrated in FIG. 2, a person or several people in Building 1 have perceived an alert situation 18, which may be a gunman, a fire or the like in Building 1 that should be transmitted as a warning to the nearby buildings. These people, as the alert initiators 26, will call the alert processing device 30 and record the alert message 16, which is then broadcast to the other members of the group 14, which are alert recipients 28. The alert recipients 28 in Buildings 2 and 3 will then take appropriate action, such as evacuating the building or increasing security awareness. FIG. 3 illustrates a business group 24, which in the figure is a strip type mall having a group of mall stores, Stores 1 through 10, and an anchor store, Store 11, with at least one security guard patrolling the business area. In the scenario of FIG. 4, someone in Store 10 has perceived an alert situation 18, which may be a customer with a gun or a missing child, and has called the alert processing device 30, thereby becoming the alert initiator 26, to record an alert message 16 describing the alert situation 18. Once alert message 16 is recorded, the alert processing device 30 calls each of the other stores, Stores 1-9 and 11, and the security guard, thereby becoming the alert recipients 28, to broadcast the alert message 16 so that the alert recipients 28 may take action as appropriate. The scenarios set forth above and in FIGS. 2 through 4 are exemplary of possible group members 12, groups 14, alert messages 16 and alert situations 18 that may be applicable to the alert notification system 10 of the present invention and are not intended to limit the application thereof.

One of the important aspects of the present invention is to be able to verify that the alert initiator 26 is actually a member 12 of a recognized group 14 in order to reduce or virtually eliminate the possibility of false or prank alert messages 16 being sent out to a group of alert recipients 28. In a preferred embodiment of the present invention, the database of the alert notification system 10 has the name, telephone number (used for receiving messages 16) and a personal identification number (PIN) for each subscriber 12. When a subscriber calls the alert processing device 30, the communication component 34 of the computer system includes a caller ID processor that compares the caller's telephone number to information stored in the database. If a match is found, meaning that the caller is calling from a telephone which is on one or more recipient lists. If no match is found, then the alert processing device 30 requests the caller to enter a telephone number that is in the system, thereby allowing subscribers to call in an alert message 16 from a non-registered telephone (much the same way telephone voice mail systems operate). Once the caller ID or caller-entered telephone number is matched to a subscriber's telephone number is, then the alert processing device 30 requires the caller to enter his or her PIN to verify that the caller has authority to initiate an alert message 16. If the correct PIN is entered, meaning that it matches the subscriber's telephone number, then the caller is prompted to leave an alert message 16. If an incorrect PIN is entered, then the telephone call is terminated (typically after providing the caller a chance to re-enter the proper PIN). Use of the above or equivalent verification system prevents unauthorized persons, which may be non-subscribers, a child or children of a subscriber 12 that does not have permission or a restricted subscriber who is only allowed to receive alerts, from creating a false or misleading alert message 16.

Due to the nature of the alert messages 16 associated with the alert notification system 10 of the present invention, the preferred embodiment also includes an audit trail capability that allows later review of an alert message 16. The audit trail capability should be configured to track information regarding the alert initiator 26 and the alert message 16. With regard to the alert initiator 28, the alert processing device 30 should keep track of the name of the alert initiator 29, his or her registered phone number, the telephone number he or she called in on and the PIN number entered which allowed the alert message 16 to be broadcast. With regard to the alert message 16, the alert processing device 30 should "stamp" the alert message 16 with a record identifier that at least records the time and length of the alert message. In a preferred embodiment, a recording of the alert message 16 is archived for purposes of quality control, system usage review and possible subpoena requirements. Generally, it will be beneficial to store the archived voice messages, which may be somewhat large files, in an off-site storage system so as to not burden the computer capabilities of the alert processing device 30. Preferably, the above audit information will be kept in a caller/message log that is readily accessible and reviewable by the system administrator 32 as desired or required.

Figure 5:
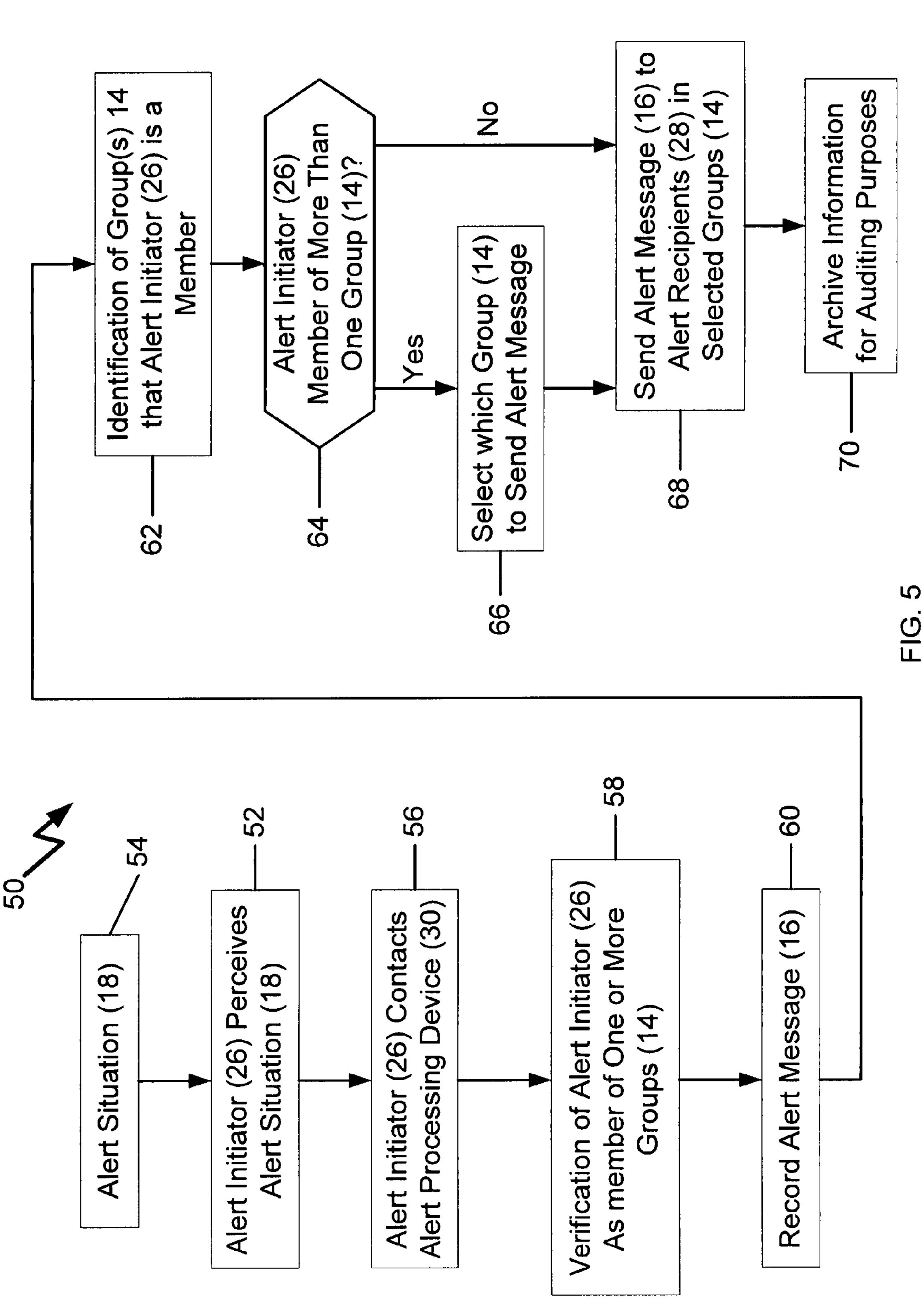
FIG. 5 is a process flow diagram illustrating a method of formulating and then transmitting an alert message to members of a group in accordance with embodiments of the present invention.

An exemplary method, shown as 50, of utilizing the alert notification system 10 of the present invention is illustrated in the flow diagram shown in FIG. 5. Once groups 14 of subscribers 12 are established, either by the system administrator 32 placing various like subscribers 12 together, the subscribers 12 joining as a group 14 (i.e., a group of neighbors joining system 10 together) or persons who have later joined an existing or new group 14 (i.e., such as joining through an automated website process), the alert notification system 10 is ready for use. The method of use starts at block 52 with the alert initiator 26 perceiving an alert situation 18, shown in block 54. As stated above, the alert initiator 26 may perceive of the alert situation 18 by visually seeing activity or indirectly hearing about such activity. Once the alert initiator 26 identifies the alert situation 18 as being of likely concern to one or more members 12 of his or her group 14, the alert initiator 26 telephones the alert processing device 30, as shown at block 56. At block 58, the communication component 34 of the alert processing device 30 answers the telephone call, compares the caller ID information to the subscriber database and greets the alert initiator 26. If a match is found between the caller ID and a phone number in the system database, then the alert processing device 30 states a greeting that requests the alert initiator 26 to enter his or her PIN. If no match is found, the greeting requests the alert initiator 26 to enter his or her registered telephone number and, if it matches the database, enter the PIN. Once alert initiator 26 is verified as an authorized member of the alert notification system 10 who has permission to broadcast an alert message 16, the alert processing device 30 requests, at block 60, the alert initiator 26 to record the alert message 16 that he or she desires to broadcast to fellow group members 12, who are the alert recipients 28. At block 62, the alert processing device 30 associates the alert initiator 26 with one or more groups. Internally, the processing software determines if the alert initiator belongs to one or more groups, as shown at block 64. If the answer is yes, the greeting requests the user to select, at block 66, one or more of the groups to receive the previously recorded message 16. Once the group 14 is selected or if the answer to the multiple group question is no, meaning the alert initiator 26 only belongs to one group 14, then the alert processing device 30, through its communication component 34, broadcasts the alert message 16 to each of the members of the group 14 (now alert recipients 28), as shown at block 68. The alert recipients 28 will take action that they deem necessary to protect themselves, their loved ones and/or their property. At block 70, the alert processing device 30 will record the desired caller and message attributes for auditing purposes and, if desired, send the recorded alert message 16 to archive for storage.

In conclusion, the present invention provides novel systems and methods for a person or entity who is a member of a group to quickly, efficiently and effectively notify other members of the group of an alert situation so that they may take action as they deem fit. The present invention empowers the members of the group, both individually and collectively, by providing more control over undesirable circumstances and a way for the group members to work together to improve their lives. While there are shown and described herein specific forms of the present invention, it will be readily apparent to those skilled in the art that the invention is not so limited, but that it is susceptible to various modifications and alternatives without departing from the spirit and scope of the present invention. For instance, there are numerous components described herein that can be replaced with equivalent functioning components to accomplish the objectives of the present invention. As such, the above description should not be taken as limiting the scope of the invention, which is defined by the appended claims.

What is claimed is:

1. An alert notification system, comprising:

at least one group comprising a plurality of group members, said group members including at least one alert initiator and one or more alert recipients; and an alert processing device having a communication component configured to receive a first communication from said alert initiator and transmit a second communication to said each of said alert recipients, said first communication comprising an alert message describing an alert situation, said second communication comprising said alert message, said alert processing device configured to select said group based on said alert initiator being in said group.

2. The alert notification system according to claim 1, wherein said at least one group comprises a neighborhood group and said group members are neighbors.

3. The alert notification system according to claim 1, wherein said at least one group comprises a work location group and said group members have employees that work at or near the same location as each other.

4. The alert notification system according to claim 1, wherein said at least one group comprises a business group and said group members are businesses that at or near the same location as each other.

5. The alert notification system according to claim 1 further comprising a system administrator, said system administrator in communication with said alert processing device to maintain said alert notification system.

6. The alert notification system according to claim 1, wherein each of said first communication and said second communication are telephone calls.

7. The alert notification system according to claim 6, wherein said alert message is an audible recording.

8. The alert notification system according to claim 1, wherein said alert message is an audible recording.

9. A method of broadcasting an alert message regarding an alert situation from an alert initiator member of a group to one or more alert recipient members of said group, said method comprising the steps of:

a) perceiving said alert situation by said alert initiator member of said group;

b) contacting an alert processing device by said alert initiator member;

c) verifying the authority of said alert initiator member to contact said alert processing device;

d) recording said alert message at said alert processing device from said alert initiator member;

e) associating said alert initiator member with said group;

f) selecting one or more groups to receive said alert message if said alert initiator is in two or more groups; and g) sending said alert message to each of said alert recipient members of said group.

10. The method according to claim 9, wherein said contacting step is accomplished by telephone communication and said recording step comprises an audible recording.

11. The method according to claim 9, wherein said verifying step comprises comparing a caller ID with information stored in a database for said alert initiator member.

12. The method according to claim 11, wherein said verifying step further comprises comparing a PIN entered by said alert initiator member with information stored in a database for said alert initiator member.

13. The method according to claim 9, wherein said recording step and said sending step comprise an audible recording of said alert message.

14. The method according to claim 9, wherein said group comprises a neighborhood group and said alert initiator member and said alert recipient members are neighbors.

15. The method according to claim 9, wherein said group comprises a work location group, said alert recipient members having employees that work at or near the same location as each other.

16. The method according to claim 15, wherein said alert initiator member is at or near the same location as said alert recipient members.

17. The method according to claim 9 further comprising the step of:

g) identifying caller and message attributes of said alert message for later auditing.

18. The method according to claim 9, wherein said group comprises a business group, said alert recipient members are businesses that are located at or near the same location as each other.

19. The method according to claim 18, wherein said alert initiator member is at or near the same location as said alert recipient members.

* * * * *